(12) United States Patent
Jayaraman et al.

(10) Patent No.: US 10,868,708 B2
(45) Date of Patent: Dec. 15, 2020

(54) SYSTEM AND METHOD FOR HANDLING LINK LOSS IN A NETWORK

(71) Applicant: Google Inc., Mountain View, CA (US)

(72) Inventors: Arunkumar Jayaraman, Cupertino, CA (US); Peter Gelbman, Mountain View, CA (US); Michael John Hart, San Jose, CA (US); Rajkumar Samuel, Cupertino, CA (US)

(73) Assignee: Google LLC, Mountain View, CA (US)

( * ) Notice: Subject to any disclaimer, the term of this patent is extended or adjusted under 35 U.S.C. 154(b) by 748 days.

(21) Appl. No.: 14/929,991

(22) Filed: Nov. 2, 2015

(65) Prior Publication Data

US 2017/0126482 A1   May 4, 2017

(51) Int. Cl.
| | |
|---|---|
| *H04L 12/703* | (2013.01) |
| *H04L 12/707* | (2013.01) |
| *H04L 12/721* | (2013.01) |
| *H04L 12/24* | (2006.01) |
| *H04L 12/715* | (2013.01) |
| *H04L 12/751* | (2013.01) |

(52) U.S. Cl.
CPC .......... *H04L 41/0668* (2013.01); *H04L 45/22* (2013.01); *H04L 45/28* (2013.01); *H04L 45/64* (2013.01); *H04L 45/02* (2013.01)

(58) Field of Classification Search
CPC ............. H04L 41/0668; H04L 41/0681; H04L 41/0816; H04L 45/02; H04L 45/22; H04L 45/28; H04L 45/64
See application file for complete search history.

(56) References Cited

U.S. PATENT DOCUMENTS

| | | |
|---|---|---|
| 5,398,236 A | 3/1995 | Hemmady et al. |
| 5,933,422 A | 8/1999 | Kusano et al. |
| 6,392,989 B1 * | 5/2002 | Jardetzky ............ H04L 41/0663 370/216 |
| 6,745,350 B1 | 6/2004 | Cline et al. |
| 7,672,241 B2 | 3/2010 | Foore et al. |

(Continued)

FOREIGN PATENT DOCUMENTS

| | | |
|---|---|---|
| CN | 101960785 A | 1/2011 |
| CN | 104079465 A | 10/2014 |

(Continued)

OTHER PUBLICATIONS

Hongsik Choi et al, "On Double-Link Failure Recovery in WDM Optical Networks", IEEE INFOCOM 2002, pp. 808-816.

(Continued)

*Primary Examiner* — Brian P Cox
(74) *Attorney, Agent, or Firm* — Lerner, David, Littenberg, Krumholz & Mentlik, LLP

(57) ABSTRACT

In a network including a plurality of network nodes interconnected via a plurality of primary links and a controller in communication with the plurality of network nodes, the controller is configured to provide an event profile to the plurality of network nodes, the event profile indicating routing changes to be implemented in a variety of link loss scenarios. Each of the plurality of nodes is configured to determine that a particular link loss event occurred, determine, based on the event profile, routing changes for the particular link loss event, and implement the determined routing changes.

20 Claims, 6 Drawing Sheets

(56) References Cited

U.S. PATENT DOCUMENTS

| | | |
|---|---|---|
| 7,729,278 B2 | 6/2010 | Chari et al. |
| 8,811,212 B2 | 8/2014 | Beheshti-Zavareh et al. |
| 2002/0072355 A1 | 6/2002 | Jeong et al. |
| 2002/0116669 A1 | 8/2002 | Jain |
| 2002/0150043 A1 | 10/2002 | Perlman et al. |
| 2002/0171886 A1 | 11/2002 | Wu et al. |
| 2003/0001079 A1 | 6/2003 | Kinstler |
| 2003/0002233 A1 | 12/2003 | Lee |
| 2004/0002185 A1 | 11/2004 | Elie-Dit-Cosaque et al. |
| 2005/0000945 A1 | 5/2005 | Golden et al. |
| 2005/0002652 A1 | 12/2005 | Fredette et al. |
| 2006/0005602 A1 | 1/2006 | Tsui et al. |
| 2007/0067663 A1* | 3/2007 | Surasinghe ......... G06F 11/1482 714/4.1 |
| 2007/0206583 A1* | 9/2007 | Nason .................. H04L 43/10 370/356 |
| 2007/0263547 A1 | 11/2007 | Hof et al. |
| 2012/0036233 A1 | 2/2012 | Scahill et al. |
| 2014/0078895 A1* | 3/2014 | Iovanna ............... H04L 45/22 370/228 |
| 2015/0026507 A1* | 1/2015 | Matsubara ............ H04L 45/22 714/4.2 |

FOREIGN PATENT DOCUMENTS

| | | |
|---|---|---|
| EP | 2811702 A1 | 12/2014 |
| JP | 2012049674 A | 3/2012 |

OTHER PUBLICATIONS

S. Ramarnurthy et al., "Survivable WDM Mesh Networks", Journal of Lightwave Technology, vol. 21, No. 4, Apr. 2003, pp. 870-883.
International Search Report and Written Opinion for PCT Application No. PCT/US2016/058211, dated Feb. 2, 2017.
Office Action for Japanese Patent Application No. 2018-507538 dated Feb. 19, 2019.
English Translation of Notice of Final Rejection for Korean Patent Application No. 10-2018-7004590 dated Apr. 9, 2019. 3 pages.
Notice of Final Rejection for Korean Patent Application No. 10-2018-7004590 dated Jun. 27, 2019.
International Preliminary Report on Patentability for Application No. PCT/US2016/058211 dated May 17, 2018. 10 pages.
Examination Report No. 1 for Australian Patent Application No. 2016348234, dated Jul. 24, 2018. 3 pages.
Written Opinion for Singapore Patent Application No. 11201800915T dated Aug. 29, 2019. 6 pages.
Notice of Allowance for Korean Patent Application No. 10-2018-7004590 dated Oct. 25, 2019.
Notice of Acceptance for Australian Patent Application No. 2016348234, dated Oct. 3, 2018. 3 pages.
Sahri N M et al: "Fast failover mechanism for software defined networking", Future Internet Technologies, ACM, 2 Penn Plaza, Suite 701 New York NY 10121-0701 USA, Jun. 18, 2014 (Jun. 18, 2014), pp. 1-2, XP058053557, DOI: 10.1145/2619287.2619303, ISBN: 978-1-4503-2942-2.
Extended European Search Report for European Patent Application No. 16862700.8 dated Apr. 4, 2019. 9 pages.
Notice of Final Rejection for Korean Patent Application No. 10-2018-7004590 dated Apr. 9, 2019.
Office Action for Korean Patent Application No. 10-2018-7004590 dated Nov. 29, 2018.
English Translation of Office Action for Japanese Patent Application No. 2018-507538 dated Feb. 19, 2019.
Notification of the First Office Action for Chinese Patent Application No. 201680046715.8 dated Apr. 8, 2020. 10 pages.
First Examination Report for Indian Patent Application No. 201847003840 dated Apr. 27, 2020. 5 pages.
Minutes of Telephone Conversation with the Examiner for European Patent Application No. 16862700.8, forwarded via e-mail on Oct. 15, 2020. 4 pages.
Office Action for European Patent Application No. 16862700.8 dated Oct. 19, 2020. 8 pages.

* cited by examiner

SYSTEM AND METHOD FOR HANDLING LINK LOSS IN A NETWORK

BACKGROUND OF THE INVENTION

A cloud managed mmWave based point-to-multipoint mesh backhaul requires a centralized scheduling of the mmWave transmissions and reception to be fully coordinated by a central cloud SDWN (Software Defined Wireless Network) controller. Further, network level routing decisions across nodes in the network are also coordinated by the controller. This assumes reliable connectivity between the managed mmWave nodes and SDWN cloud controller. However, mmWave link technologies operate at very high radio frequencies, which typically require line-of-sight (LOS) radio paths. These LOS radio paths may be inherently less reliable than conventional radio communications systems in lower frequencies, which may be able to operate in more robust non-line-of-sight (NLOS) radio paths.

Data path routing between nodes in the backhaul utilizes the same link paths as control path communication from the nodes to the controller, with the key assumption that no out-of-band mechanism exists for the communication to the controller. Simultaneously using the links that are managed by the controller for communication to the controller itself and for managing routing and channel scheduling updates creates a problem during the loss of an active link. During a link loss, the node loses the current established network path to the controller. Reverting back to either local or distributed routing will either run the risk of creating loops or broadcast storms in the network or is likely to require complex local distributed algorithms which create network management overhead.

Some networks leverage out-of-band connectivity with a controller for similar use cases, so that the actively managed link is not used for connectivity with the controller. This provides a communication path with the controller whose reliability is independent of the links being managed. However, this also requires additional connectivity technology to be implemented on the nodes being managed, possibly adding hardware, software and management cost and complexity overhead to the product.

BRIEF SUMMARY

The present disclosure highlights mechanisms applicable to cloud managed point-to-multipoint mmWave mesh backhaul enabling the controller to continue to centrally handle routing and scheduling changes to the topology during link loss. When an active link used for data path routing as well as for control path communications to the controller is disconnected, available alternate links are used. These mechanisms accommodate the highly directional nature of mmWave physical layer communications, which include, for example, high gain, narrow beam antennas, dynamic beamforming technologies such as phased arrays, etc.

One aspect of the disclosure provides a system for managing a network. The system includes a plurality of network nodes interconnected via a plurality of primary links, and a controller in communication with the plurality of network nodes. The controller includes one or more processors configured to provide an event profile to the plurality of network nodes, the event profile indicating routing changes to be implemented in a variety of link loss scenarios. Each of the plurality of nodes is configured to determine that a particular link loss event occurred, determine, based on the event profile, routing changes for the particular link loss event, and implement the determined routing changes.

Another aspect of the disclosure provides a method of updating routing information in a network node. The method includes receiving, from a controller, an event profile, the event profile indicating routing changes to be implemented in a variety of link loss scenarios. The method further include determining, with one or more processors, that a particular link loss event occurred, determining, with the one or more processors based on the event profile, routing changes for the particular link loss event, and implementing, with the one or more processors, the determined routing changes.

Yet another aspect of the disclosure provides a network node, including a memory storing one or more routing tables, and one or more processors in communication with the memory. The one or more processors are programmed to receive, from a controller, an event profile, the event profile indicating routing changes to be implemented in a variety of link loss scenarios. The one or more processors are further programmed to determine that a particular link loss event occurred, determine, based on the event profile, routing changes for the particular link loss event, and implement the determined routing changes.

DETAILED DESCRIPTION

Overview

Figure 1:
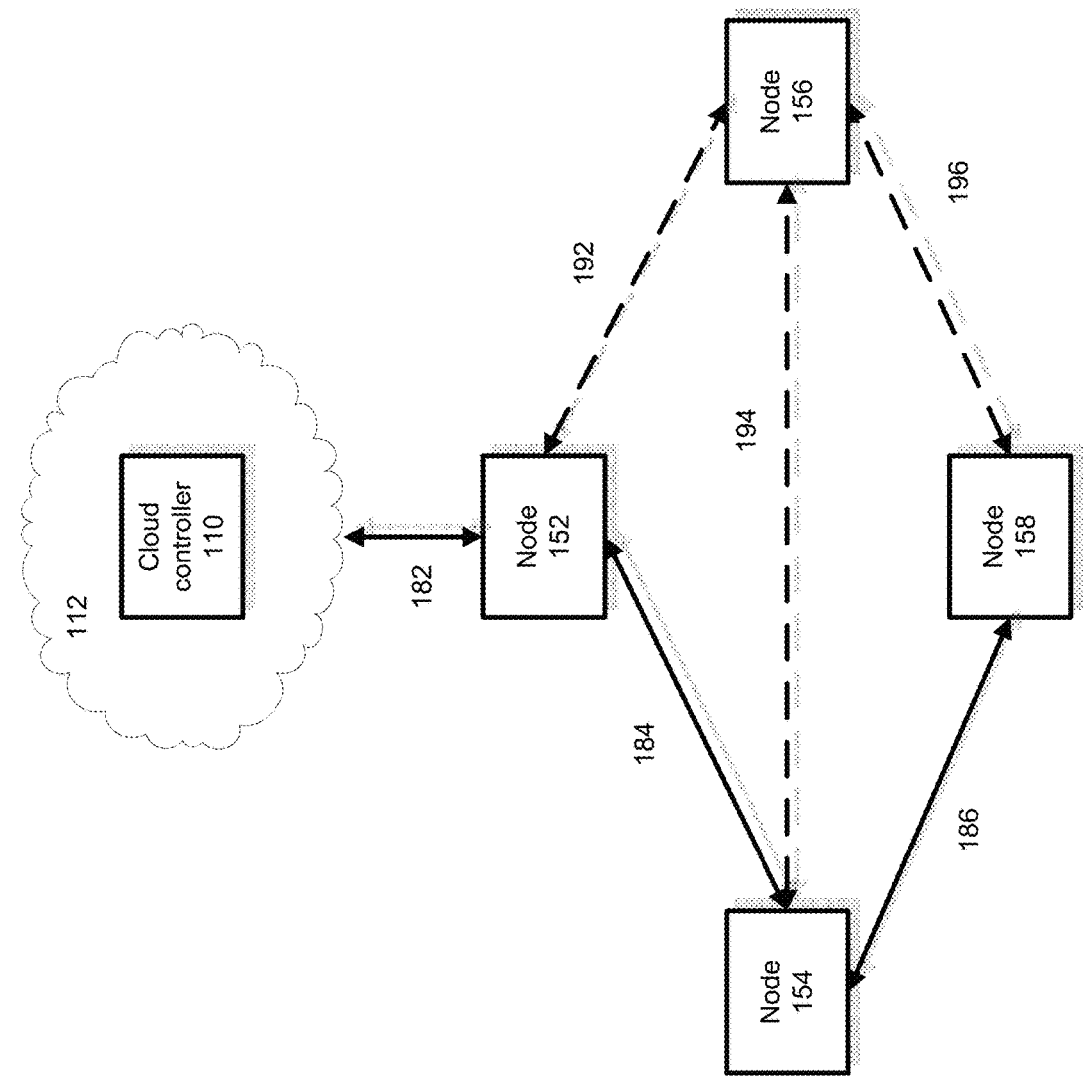
FIG. 1 is a schematic diagram of an example system according to aspects of the disclosure.

The present disclosure generally relates to managing scheduling and routing decisions in a network, such as a cloud managed mmWave based point-to-multipoint mesh backhaul. A central cloud Software Defined Wireless Network (SDWN) controller centrally manages routing and scheduling changes to the network. Each node in the network is provided with an event profile, which identifies new routes to be implemented in case of link loss, for example due to link failure or other circumstances. If a particular link or combination of links fails, applications running on the nodes connected to the failed links may broadcast the link down state. Additionally, the nodes in the network will update their routing tables to implement a new routing scheme provided in the event profile. The nodes implementing the new routing scheme may include additional nodes in the network affected by the change, despite that those additional nodes are not directly connected to the failed link.

The network nodes may include multi-gigabit speed wireless communications devices set up by the controller to communicate with neighboring nodes. The controller pushes a centralized scheduling to all the connected nodes to establish possible links. The links are highly directional. Phased arrays are one example of highly directional link technology. Primary links include paths chosen by the controller that route controller traffic and normal user data. Link level radio resource scheduling is coordinated with network level routing decisions, so that a given node is beamformed with a desired peer. With the directional phased-arrays, the backhaul topology is expected to have alternate (redundant) links. The nodes are expected to spend only a fraction of time in these links so that they maintain the beamformed link, with a primary goal exchanging very low bandwidth control traffic. These alternate links provide a possible path to the controller during primary link loss. However, there should be at least one alternate link active at the time of primary link failure. Also, latency should be kept as minimal as possible to avoid delays in restoring traffic at link loss.

The network may include many nodes, such as over one hundred nodes. Accordingly, the computation complexity of determining scheduling and routes for all permutations of link failure may be extremely challenging within the time constraints.

The event profile has the routing and scheduling instructions for normal operation and for when one or more links fail. In the topology, all scheduling and routing decisions need to be well synchronized. To accommodate, the profile indicating how nodes should respond to link loss carries all permutable possibilities of link loss. The event profile may be, for example, a lookup table or other data structure which correlates a potential link loss event with a proposed node response.

The controller also updates the profile periodically. The updates may account for any link change events. The profile is chosen to be adaptive and based on real-time feedback, taking advantage of the fact that the mmWave nodes are fixed nodes with channel conditions that are not very dynamic. The controller learns through periodic link updates about the links that have high probability of link breaks, and provides profile updates only for those permutations, thereby reducing the computational complexity that can be managed by most of the cloud implementations.

In the case of a link loss combination that does not match a profile entry, the nodes stop any further forwarding of data frames, and enter a buffering mode. The link loss broadcast eventually reaches the controller via the hub node that has wired connectivity to the controller network, and the controller responds by pushing a new route update. The hub node is expected to broadcast the new route update by controller, given that the network route will be in an unstable state until the new route is established. In some implementations the nodes may enter a temporary buffering state for link loss events that matches a profile, to ensure route updates for all neighbors before moving to a forwarding state.

Note that there are two nodes for a failed link. Both the nodes may broadcast the link loss on all the available links, optionally with the same cookie, populated in the profile table. If the newly selected primary link also fails before a new profile is pushed by the controller, the node might choose to treat that event as a link loss without a matching profile, and send a link loss event to the controller for a new route update, again as broadcast, possibly over all available links.

Such situations are expected to be rare and the changes are temporary until the controller turns around with an update after the link loss event reaches the controller.

The broadcast mechanism and inter-node communication mechanism used by the node with the failed link does not rely on controller set up SDN routing, as this happens when the primary link required for routing has failed. When a particular link fails, the node with the failed link broadcasts a notification. The notification may be broadcast using any of a variety of propagation methods. According to one example, a routing mechanism may use raw sockets and special ether types, optionally using one or more nodes as a controller proxy. For example, the node with the failed link broadcasts a frame with a special ether type. All the nodes are set up with a switching entry that detects the ether type, and forwards it to the application running on the node. The application receives it over raw sockets, and the underlying network does not redistribute the broadcast frame. The receiving node may choose to re-transmit the link failure on all the available interfaces, if it has not already done a broadcast for the matching cookie within the configured duration in the past. The application looks at a specific cookie in the broadcast frame to identify if it has previously forwarded the frame, before attempting to forward it again, ensuring that there are no loops in the topology. A 'hub node' that is connected to the controller over a wired network will additionally send the broadcast frame to the controller as well, so that the controller can make future decisions.

According to another example, standard layer 2/layer 3 (L2/L3) routing mechanisms can be used. For example, control traffic may be L2 isolated, such as in a virtual local area network (VLAN). Yet another approach is to modify standard L2/L3 routing algorithms, optimized for latency and mmWave characteristics. As an example, in an Optimized Link State Routing (OLSR) algorithm, any required behavior or parameters may be modified for faster route convergence. Moreover, broadcast latencies may also be modified for controlled, directional mmWave networks. The controller and inter-node messaging mechanism may be predetermined based on, for example, system deployment scenarios and routing characteristics of the particular network.

Upon receiving the broadcast frame, and determining whether or not to forward it, each node updates its routing table based on the event profile. For example, a given node may receive multiple broadcast frames, the frames indicating that a particular combination of links has failed. The given node consults the event profile, and identifies a predetermined recommended response corresponding to that particular combination of failed links. The given node can then update its routing table based on the predetermined recommended response. Each other node in the network also performs the same procedure.

The techniques described above are advantageous in that they require a lower product cost and power as the product does not need an additional, robust wireless technology for out-of-band access to the controller, and possibly better performance as the local inter-node communication required to re-establish the routes are expected to have better latency than a controller response.

Example Systems

FIG. 1 illustrates an example system 100, including a cloud controller 110 and an interconnected plurality of nodes 152-158. While only several nodes are shown, it should be understood that numerous nodes may be included. The nodes are interconnected with the cloud controller 110 via a link 182 and are interconnected with each other via a plurality of primary links 184-186 and alternative links 192-196.

Network 112 may be SDWN, or any other type of network such as a datacenter, a load-balanced server farm, a backplane of interconnected peripherals, a system of components on a motherboard, etc. The network 112, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing.

The controller may be, for example, a central cloud SDWN controller, which centrally manages routing and scheduling changes to the network. The controller pushes a centralized scheduling to all the connected nodes to establish possible links. The controller also provides each node in the network with an event profile, which identifies new routes to be implemented in case of link loss. The controller also updates the profile periodically. The updates may account for any link change events, such as down links, repaired links, and links having a high probability of failing. The profile is chosen to be adaptive and based on real-time feedback.

The nodes 152-158 may be, for example, multi-gigabit speed wireless communications devices set up by the controller to communicate with neighboring nodes. Each of the nodes 152-158 runs an application, which may be used for communicating with the other nodes. For example, if node 154 identifies a failure of a particular link or combination of links, it may broadcast the failure to the other nodes in the network through the application. Assuming links 184, 186 are still active, applications running on nodes 152 and 158 will receive the broadcast "link down" information over raw sockets. The receiving nodes 152, 158 determine if they have previously broadcast the same "link down" information, and if not, the nodes 152, 158 broadcast that "link down" information to other connected nodes.

The node 152, which is connected to the controller 110, serves as a hub node. Continuing the example above, when the node 152 receives the "link down" information, it also forwards the information to the controller 110, thereby enabling the control 110 to make future routing decisions.

The nodes in the network will update their routing tables to implement a new routing scheme provided in the event profile. For example, upon identifying a link down event, such as by detecting that one or more links connected thereto are down or by receiving "link down" information broadcast by a connected node, the node may refer to the event profile for instructions on how to handle the identified link down event. The event profile may indicate that the node should replace one or more paths with one or more new paths identified in the event profile. The nodes implementing the new routing scheme may include additional nodes in the network affected by the change, despite that those additional nodes are not directly connected to the failed link. For example, if the node 156 receives "link down" information indicating that link 184 has failed, the node 156 may consult the event profile and update its routing table accordingly.

The primary links 184-186 may be highly directional links for mmWave physical layer communications, such as phased arrays. The primary links 184-186 include paths chosen by the controller 110 that route controller traffic and normal user data. Link level radio resource scheduling is coordinated with network level routing decisions, so that a given node is beamformed with a desired peer. With the directional phased-arrays, the backhaul topology is expected to have alternate (redundant) links. The nodes are expected to spend only a fraction of time in these links so that they maintain the beamformed link, with a primary goal exchanging very low bandwidth control traffic. These alternate links The alternate links 192-196 provide a possible path to the controller during primary link loss. Whether a link is considered a primary link or an alternate link may be relevant to a particular node or path. For example, a primary path from the node 152 to the node 154 may include primary link 184, while an alternate path may include alternate links 192, 194. There should be at least one alternate link active at the time of a primary link failure. Also, latency should be kept as minimal as possible to avoid delays in restoring traffic at link loss.

According to one example, the node 154 may detect a failure of the primary link 186. An inter-node communication mechanism used by the node 154 does not rely on any specific routing. Rather, the node 154 with the failed link broadcasts a frame with a special ether type. All the nodes 152-158 are set up with a switching entry that detects the ether type, and forwards it to an application running on the node. Accordingly, applications running on the nodes 152, 156, 158 receive the broadcast frame over raw sockets, and the underlying network does not redistribute the broadcast frame. The applications running on each of the nodes 152, 156, 158 look at a specific cookie in the broadcast frame to identify if it has previously forwarded the frame. If any of the applications on the receiving nodes 152, 156, 158 has not previously forwarded the frame, that application will retransmit the frame on all available interfaces.

As the failed primary link 186 is also coupled to the node 152, the node 152 may also detect and broadcast the link loss on all the available links contemporaneously with the node 154. In some examples, the broadcast by the node 152 may include the same cookie as the broadcast by the node 154.

Continuing the example above, each receiving node 152, 156, 158 updates its routing table based on the event profile. For example, the node 156 may receive multiple broadcast frames, each frame identifying a different failed link. Taken together, the multiple broadcast frames indicate a particular combination of failed links. In some examples, the node 156 collects one or more frames and consults the event profile for a routing update corresponding to the combination of failed links. In other examples, the node 156 consults the event profile for each individual notification received. In either case, the node 156 can then update its routing table based on a predetermined recommended response in the event profile. The other nodes 152, 158 in the network also perform the same procedure. In some examples, the nodes 152, 156, 158 may enter a temporary buffering state before moving to a forwarding state while retransmitting the broadcast frame.

In some instances, a link loss combination may not match a profile entry. In this event, the nodes 152-158 may stop any further forwarding of data frames, and enter a buffering mode. The link loss broadcast eventually reaches the controller 110 via the hub node 120 that has wired connectivity, for example via link 182, to the controller network. In response, the controller 110 pushes a new route update. The hub node 152 broadcasts the new route update.

It is possible that a newly selected primary link also fails before a new profile is pushed by the controller. In this case, the node might choose to treat that event as a link loss without a matching profile. Accordingly, the node may send a link loss event to the controller for a new route update, for example, as broadcast over all available links.

Figure 2:
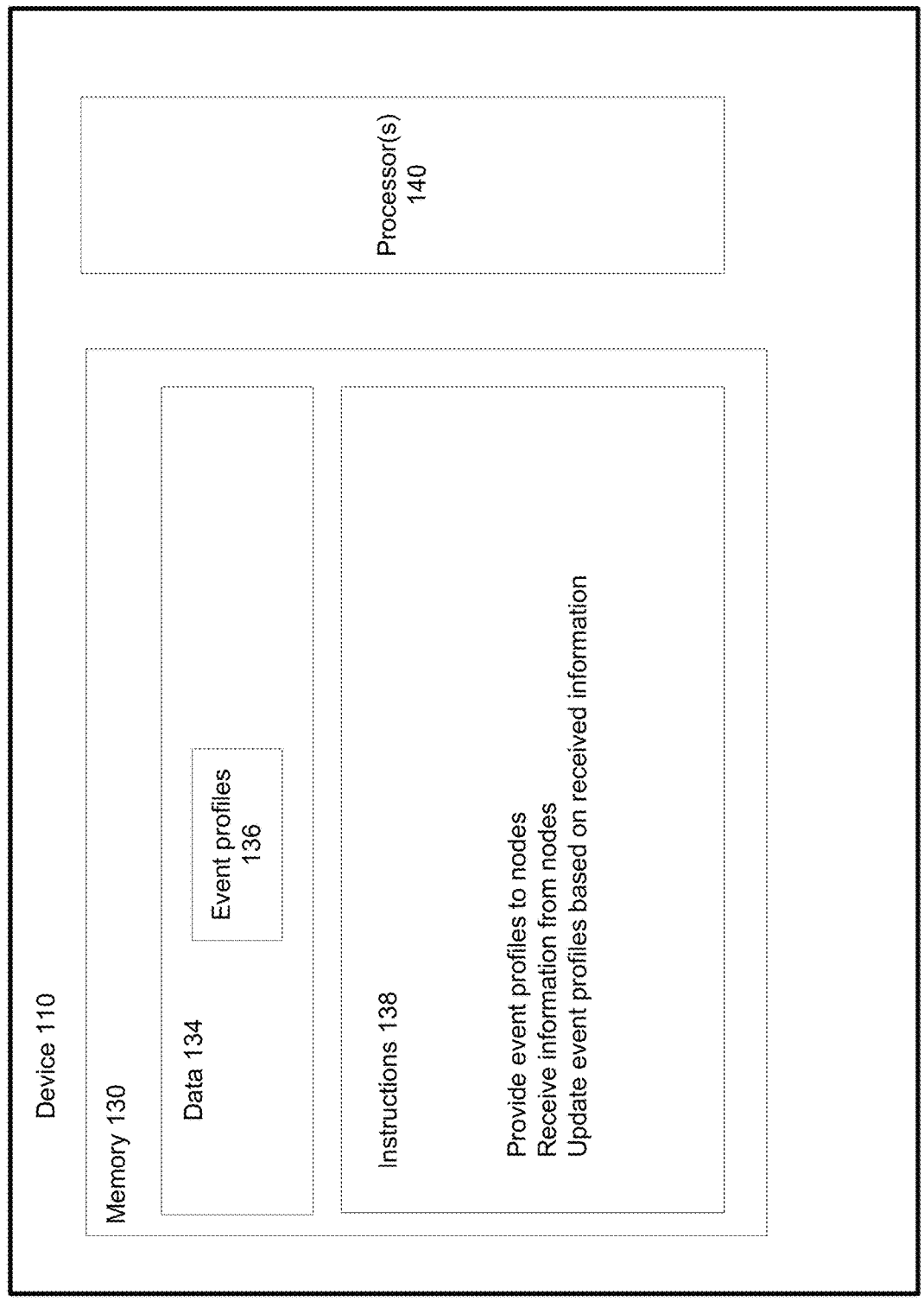
FIG. 2 is a block diagram of an example controller according to aspects of the disclosure.

FIG. 2 provides a more detailed depiction of the controller 110. The controller 110 may be any type of virtualized or non-virtualized computing device or system of computing devices capable of communicating over a network. Controller 110 can contain one or more processors 140, memory 130 and other components typically present in general purpose computing devices. The memory 130 can store information accessible by the one or more processors 140, including instructions 138 that can be executed by the one or more processors 140.

Memory 130 can also include data 134 that can be retrieved, manipulated or stored by the processor 140. The memory can be of any non-transitory type capable of storing information accessible by the processor, such as a hard-drive, memory card, RAM, DVD, write-capable, etc.

The instructions 138 can be any set of instructions to be executed directly, such as machine code, or indirectly, such as scripts, by the one or more processors. In that regard, the terms "instructions," "applications," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 134 can be retrieved, stored or modified by the one or more processors 140 in accordance with the instructions 138. In one example, the data 134 may include one or more event profiles 136 provided to the nodes 152-158. The event profile 136 may be a master event profile which provides routing instructions for every node in the event of link failure. In another example, the event profile 136 may include a number of event profiles, such as one profile specific to each node in the network.

In accordance with the instructions 138, the controller 110 may provide the event profile 136 to the nodes in the network. The controller 110 may further receive information from the nodes, such as information identifying links that are down or links that are likely to break. The controller 110 can use this information to update the event profiles. The updated event profiles are again provided to the nodes.

Although the subject matter described herein is not limited by any particular data structure, the data 134 can be stored in internal or external memory, computer registers, in a relational database as a table having many different fields and records, or XML documents. The data 134 can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 140 can be any conventional processors, such as commercially available CPUs. Alternatively, the processors can be dedicated components such as an application specific integrated circuit ("ASIC") or other hardware-based processor. Although not necessary, the server 130 may include specialized hardware components to perform specific computing processes.

Although FIG. 2 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

Figure 3:
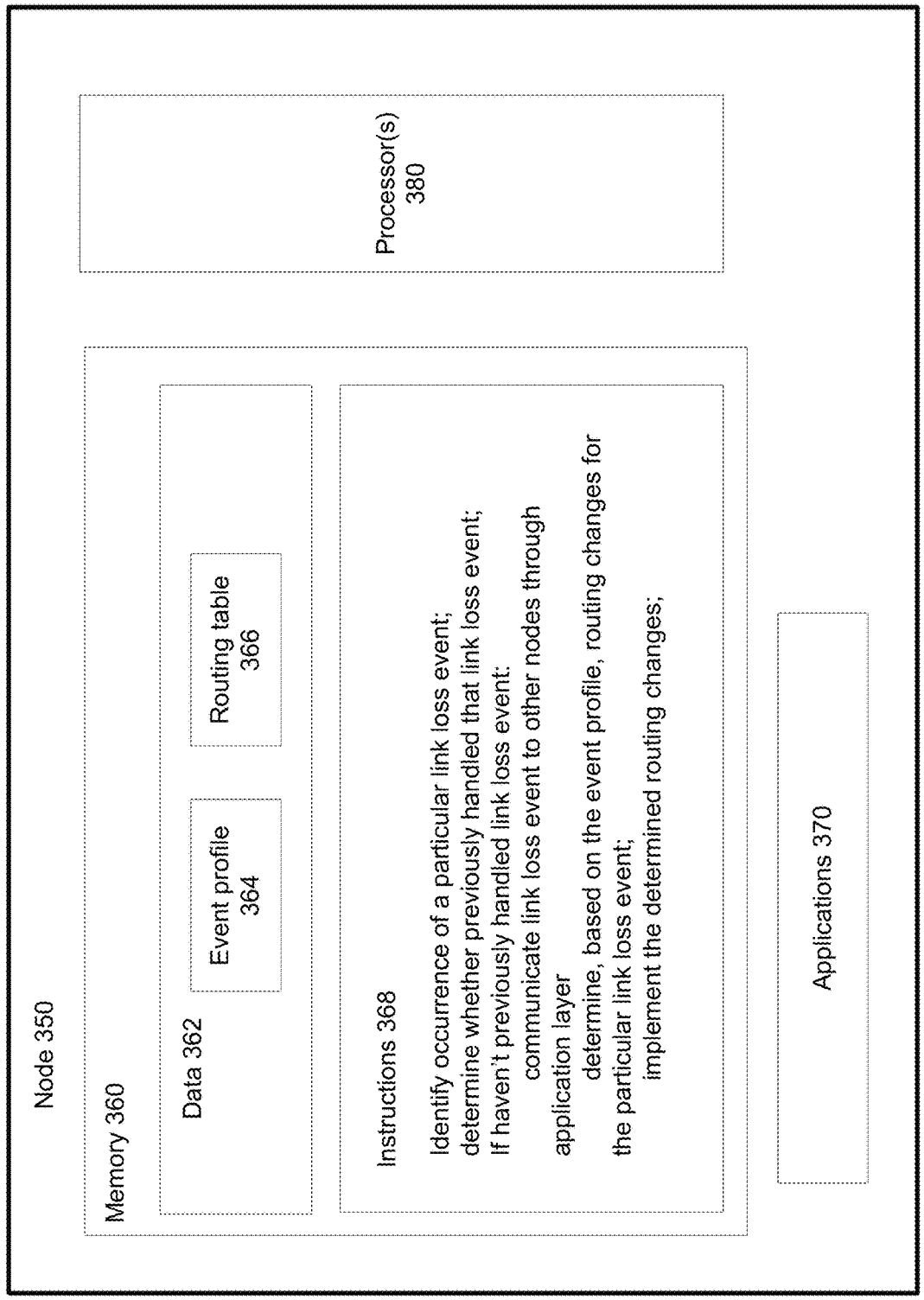
FIG. 3 is a block diagram of an example node according to aspects of the disclosure.

FIG. 3 provides a more detailed depiction of an example node 350. In some examples, the node 350 may be structured similarly to the controller 110, with one or more processors 380 and memory 360, including data 362 and instructions 368 as described above. In some examples, the node 350 may be a network device, such as a server, a router, or any other type of computing device. In some examples, the node 350 may be a personal computing device having all of the components normally used in connection with a personal computing device, such as a central processing unit (CPU), memory (e.g., RAM and internal hard drives) storing data and instructions, a display (e.g., a monitor having a screen, a touch-screen, a projector, a television, or other device that is operable to display information), user input device (e.g., a mouse, keyboard, touch-screen or microphone), and all of the components used for connecting these elements to one another.

The node 350 may also include one or more applications 370 which may be executed on the node 350. The applications 370 may be configured to perform a variety of functions, including facilitating communication among various nodes. For example, the application may include a socket listening over all interfaces. The applications 370 may make decisions regarding whether or not to send notifications, such as broadcast frames. While the applications 370 are shown as being separate from memory 360, it should be understood that the applications may be integrated with the memory 360.

In some examples, the node 350 may include other features for inter-node communication. For example, the node 350 may be equipped with ports or interfaces for L2/L3 routing.

The node 350 may store data 362, such as an event profile 364 and a routing table 366. The event profile 364 may be a table or other data structure pushed by the controller 110 (FIG. 2) that provides information to the node 350 in the event of link failure. The event profile 364 stored on the node 350 may be the same as the event profile 136 of FIG. 2. In other examples, it may be specific to the node 350. The routing table 366 may be any type of routing table capable of being updated by at least one of the node 350 and the controller 110.

The instructions 368 programmed on the node 350 enable the node 350 to identify the occurrence of a particular link down event. The identifying may include detection, receipt of a notification from a neighboring node, or any other technique. The node 350 determines whether it previously handled the link down event, and if not, communicates the event to other nodes in the network. As mentioned above, this determination and the subsequent communication may be performed by the applications 370.

The node 350 may further determine, based on the event profile 364, routing changes corresponding to the particular link loss event. The node 350 accordingly updates the routing table 366 based on the predetermined routing changes.

Figure 4:
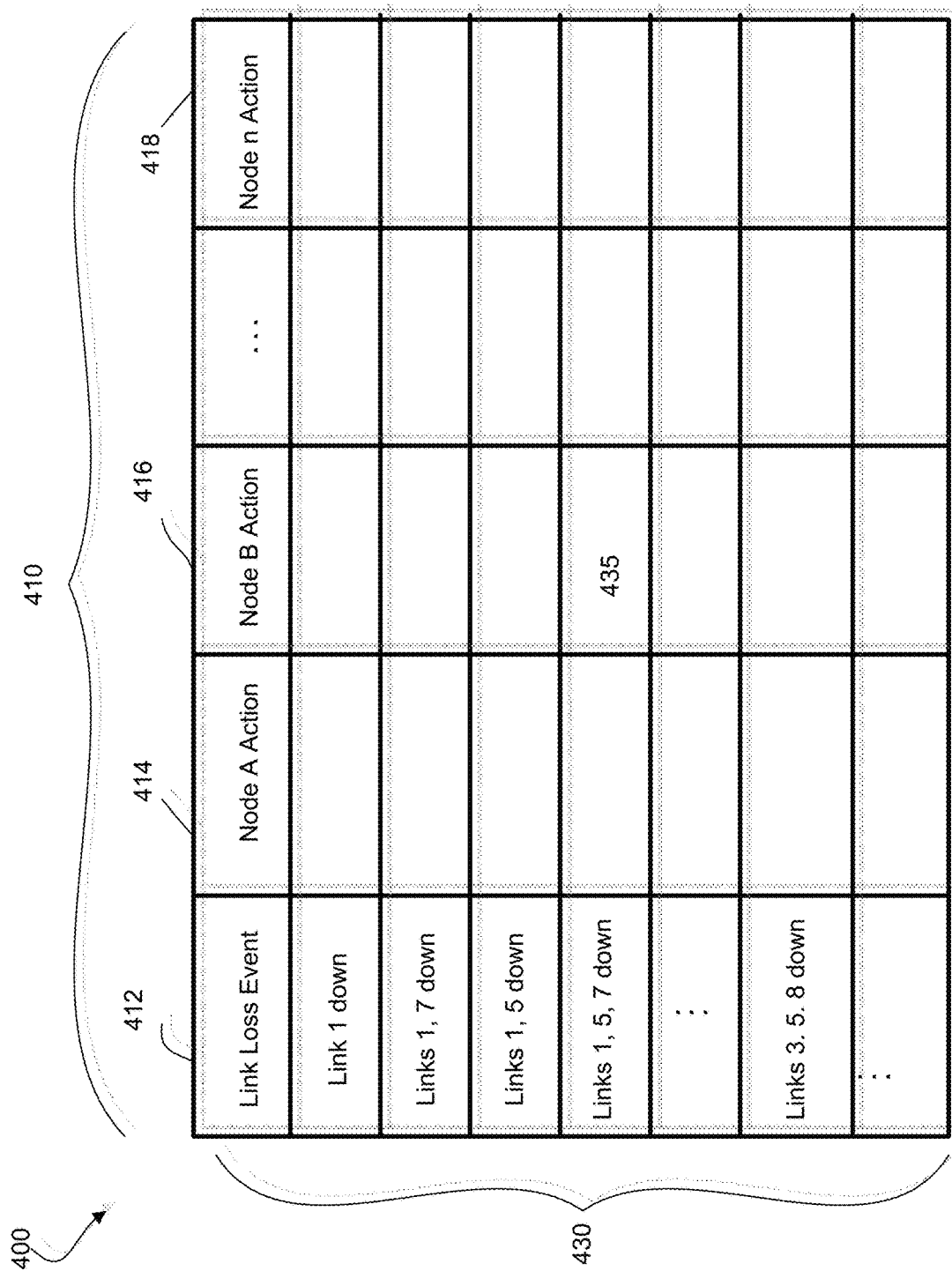
FIG. 4 illustrates an example event profile according to aspects of the disclosure.

FIG. 4 illustrates an example event profile 400. In this example, the event profile 400 is a table, including a plurality of columns 410 and rows 430. A first column 412 in each row 430 may indicate a particular link loss event. For example, each cell may indicate one of many possible combinations of down links, such as a "link 1" being down, "link 1" and a "link 3" being down, etc. While only a few combinations are shown, many permutations may be included. For example, for larger networks including hundreds or thousands of nodes, the event profile 400 may include thousands of possible link loss events or more.

Corresponding to each entry in the first link loss event column 412 is an entry in a column designated for a specific node. For example, column 414 may identify actions to be taken by node A, column 416 may identify actions to be taken by node B, column 418 may indicate actions to be taken by node n, etc. The actions may include instructions for updating the routing table of the specific node. For example, for a link loss event in cell 435 corresponding to links 1, 5, and 7 being down, the node B may be instructed to modify one or more entries in one or more of its routing tables.

While the example event profile is shown in FIG. 4 as a table, other data structures may be used.

Example Methods

In addition to the foregoing, methods according to the present disclosure are now described. While operations of the methods are described in a particular order, it should be understood that the order of operations may be varied. Some operations may be performed simultaneously. Additionally, operations may be added or omitted.

Figure 5:
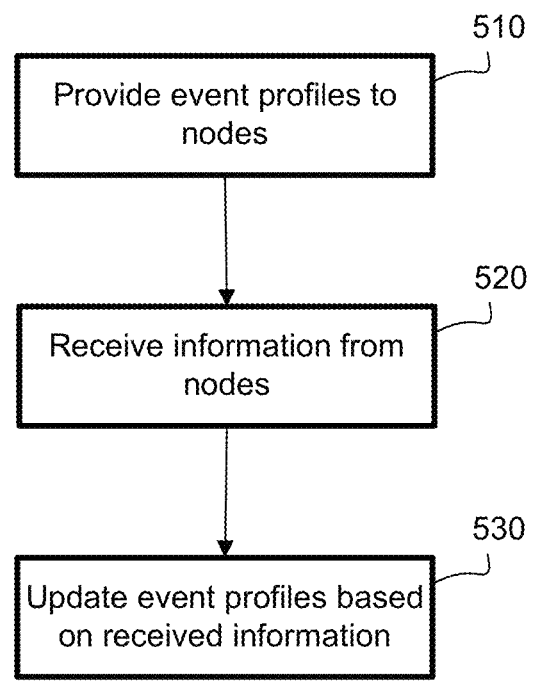
FIG. 5 is a flow diagram illustrating an example method according to aspects of the disclosure.

FIG. 5 illustrates an example method 500 of controlling routing and updating in a network. In block 510, the controller provides event profiles to nodes in the network. For example, the controller may provide to each node in the network a master event profile indicating actions to be taken by various nodes in the event of a number of possible link failure combinations.

In block 520, the controller receives information from one or more of the nodes. For example, information from various nodes may be passed to the controller through a hub node. The information may indicate the status of one or more links. For example, the status may identify a link as being down or likely to fail. A link may be determined to be likely to fail based on, for example, current metrics such as higher error rate or decreasing signal strength. In other examples, the determination could be based on statistical analysis by the controller. For example, the controller may look at the link history to determine susceptible links and adaptively modify failure thresholds for such links to be more aggressive.

In block 530, the controller updates the event profiles based on the received information. For example, the received information may be aggregated, and collectively it may identify a combination of links likely to fail. If that combination is not already listed in the event profile, the controller may add routing changes for the nodes for that possible link loss event. The controller may further push the updated event profile to the nodes.

Figure 6:
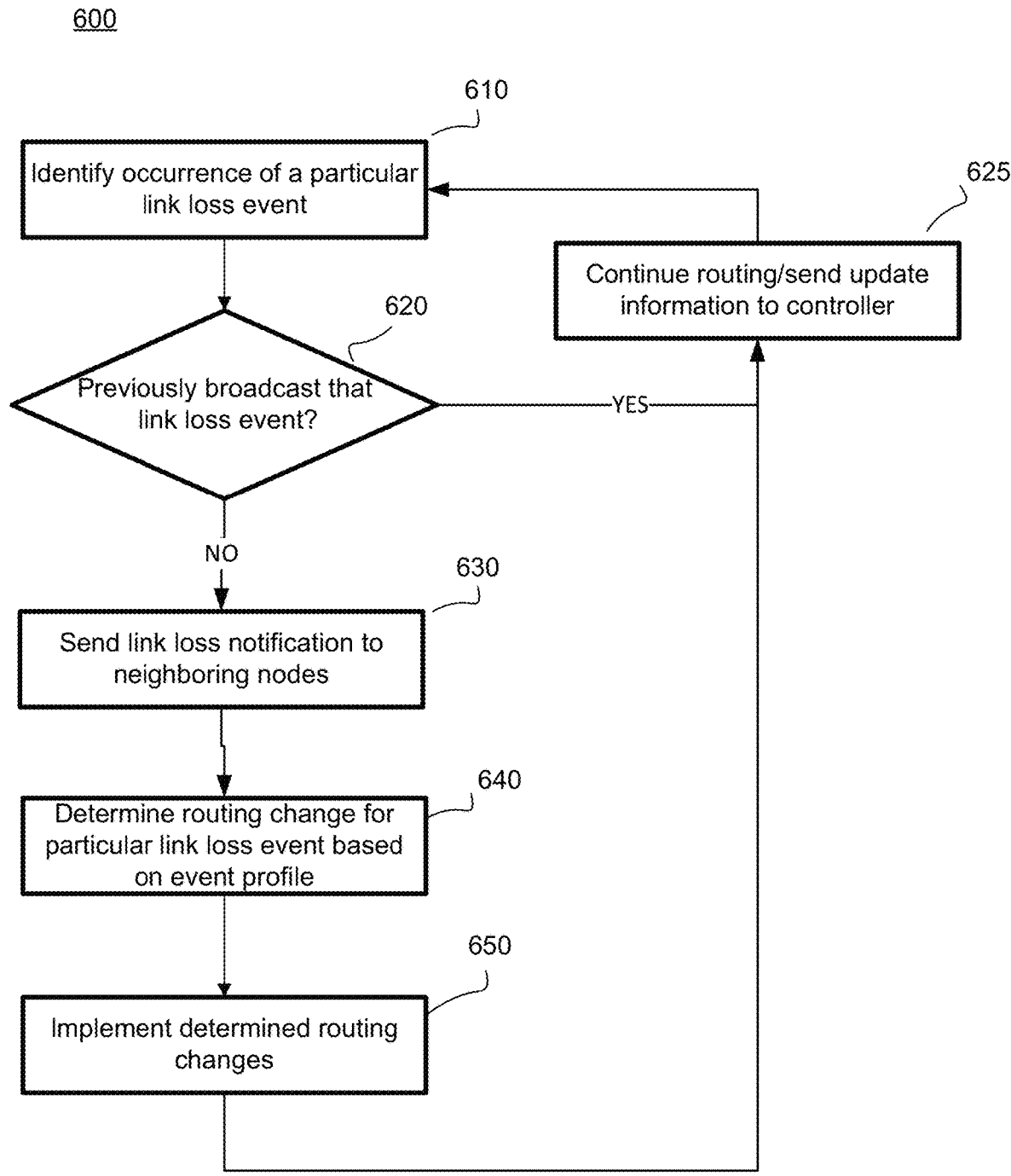
FIG. 6 is a flow diagram illustrating another example method according to aspects of the disclosure.

FIG. 6 illustrates an example method 600 of updating routing topology. The method is described below from a perspective of a given node in the network. However, each node in the network may be programmed to perform the method 600.

In block 610, the node identifies the occurrence of a link loss event. The identifying may include detecting that one or more connected links are down, or receiving a notification from at least one of the controller and another node. For example, the node may receive the notification, through an application running thereon, from a neighboring node still connected through an active link. The link loss event may include failure or deactivation of one or a plurality of links in the network. In complex networks, a combination of links across different nodes of the network may be down at a given time.

In block 620, the node determines whether it previously communicated the link loss event to other nodes in the network. For example, the application on the given node may look at a specific cookie in a frame received from another node, the specific cookie indicating whether the given node has previously forwarded the frame. In other examples, the node may consult a log of previous transmission events.

If it is determined that the node previously transmitted a notification of the link loss event, the node may continue routing and sending information to the controller in block 625. Such information may be used by the controller to update the event profile, as discussed above in connection with FIG. 5.

If the node has not previously transmitted notification of the link loss event, in block 630 the node sends a notification to one or more neighboring nodes. For example, an application running on the node may broadcast the received frame on all interfaces.

In block 640, the node determines a routing change for the particular link loss event. Determining the routing change may include consulting the event profile to identify a predetermined action corresponding to the link loss event. In some examples, the node may receive multiple notifications of link loss events. Accordingly, the node may determine an appropriate update for the combination of failed links.

In block 650, the node implements the determined routing changes. For example, the node may modify one or more entries in a routing/forwarding table. The method 600 may then return to block 625 where the node continues routing, and monitoring for new link loss events.

The systems and methods described above may operate without an additional, robust wireless technology for out-of-band access to the controller. As a result, significant cost savings and power conservation can be realized. Moreover, performance is enhanced, as local inter-node communication required to re-establish routes is expected to have better latency than a controller response.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. For example, a node detecting occurrence of a link failure and determining that the link failure has not previously been handled by the node may update its routing table prior to broadcasting notification of the link failure to other nodes. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for managing a network, comprising:
a plurality of network nodes interconnected via a plurality of primary links;
a controller in communication with the plurality of network nodes, the controller including one or more processors configured to:
provide an event profile to the plurality of network nodes, the event profile indicating possible link loss scenarios, including potential combinations of failed links, and routing changes to be implemented by each of the plurality of nodes in the possible link loss scenarios; and
wherein each of the plurality of nodes is configured to:
store the event profile;
determine that a particular link loss event occurred;
determine, based on the event profile, routing changes for the particular link loss event; and
implement the determined routing changes; and
broadcast the particular link loss event on all available links.

2. The system of claim 1, wherein the controller is further configured to:
receive information from the plurality of nodes; and
update the event profiles based on the received information.

3. The system of claim 2, wherein:
the received information identifies links having a high probability of link breaks; and
the updating of the profiles accounts for scenarios where the identified links are lost.

4. The system of claim 1, wherein the plurality of network nodes communicate link loss events to one another through at least one of: applications on the nodes or L2 separated control paths.

5. The system of claim 4, wherein communicating the link loss events through the applications comprises:
broadcasting, by a first node of the plurality of nodes, a frame with a special ether type; and
detecting, by a second node of the plurality of nodes, the ether type and forwarding the frame to an application running on the second node.

6. The system of claim 5, wherein the second node is configured to determine whether to re-broadcast the frame, the determining based on whether the frame has not yet been transmitted over one or more interfaces.

7. The system of claim 6, wherein determining whether to re-broadcast the frame comprises looking, by the application on the second node, at a cookie in the frame.

8. A method of updating routing information in a network node, comprising:
receiving, from a controller, an event profile, the event profile indicating possible link loss scenarios, including potential combinations of failed links, and routing changes to be implemented by each of a plurality of nodes in the possible link loss scenarios;
storing, by the network node, the event profile; and
determining, with one or more processors, that a particular link loss event occurred;
determining, with the one or more processors based on the event profile, routing changes for the particular link loss event;
implementing, with the one or more processors, the determined routing changes; and
broadcasting the particular link loss event on all available links.

9. The method of claim 8, further comprising:
providing information to the controller, the information indicating a status of one or more links in the network.

10. The method of claim 9, wherein:
the information identifies links having a high probability of link breaks.

11. The method of claim 9, further comprising receiving an updated event profile from the controller in response to providing the information.

12. The method of claim 8, wherein determining that a particular link loss event occurred comprises detecting failure of a link directly coupled to the node.

13. The method of claim 8, wherein determining that a particular link loss event occurred comprises receiving a notification of the link loss event from a neighboring node.

14. The method of claim 13, further comprising:
determining whether the node has previously transmitted the notification to other nodes; and
re-transmitting the notification if it has not yet been transmitted.

15. The system of claim 14, wherein determining whether the node has previously transmitted the notification comprises looking, by an application running on the node, at a cookie in the frame.

16. The method of claim 8, further comprising communicating link loss events to other nodes in the network through an application running on the node.

17. The method of claim 16, wherein communicating the link loss events through the application comprises broadcasting a frame with a special ether type detectable by the other nodes.

18. A network node, comprising:
a memory storing one or more routing tables; and
one or more processors in communication with the memory, the one or more processors programmed to:
receive, from a controller, an event profile, the event profile indicating possible link loss scenarios, including potential combinations of failed links, and routing changes to be implemented by each of a plurality of nodes in of the possible link loss scenarios;
store the event profile in the memory;
determine that a particular link loss event occurred;
determine, based on the stored event profile, routing changes for the particular link loss event;
implement the determined routing changes; and
broadcast the particular link loss event on all available links.

19. The node of claim 18, wherein determining that a particular link loss event occurred comprises receiving a notification of the link loss event from a neighboring node; and wherein the node is further programmed to:
determine whether it has previously transmitted the notification to other nodes; and
re-transmit the notification if it has not yet been transmitted.

20. The node of claim 19, the node executing one or more applications, wherein the one or more applications determine whether the notification was previously transmitted and re-transmit the notification.

* * * * *